US008084137B2

(12) United States Patent
Ding et al.

(10) Patent No.: US 8,084,137 B2
(45) Date of Patent: Dec. 27, 2011

(54) METAL COATING COMPOSITION

(75) Inventors: Hong Ding, Hudson, OH (US); Brian J. Wayton, Medina, OH (US); Weilin Tang, Solon, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 236 days.

(21) Appl. No.: 12/351,002

(22) Filed: Jan. 9, 2009

(65) Prior Publication Data

US 2009/0182083 A1     Jul. 16, 2009

Related U.S. Application Data

(60) Provisional application No. 61/020,422, filed on Jan. 11, 2008.

(51) Int. Cl.
*B32B 27/06* (2006.01)

(52) U.S. Cl. ........................................ 428/480; 528/437

(58) Field of Classification Search .................. 428/480; 528/437

See application file for complete search history.

(56) References Cited

U.S. PATENT DOCUMENTS 6,087,469 A * 7/2000 Epple et al. ................... 528/307

* cited by examiner

*Primary Examiner* — Terressa Boykin
(74) *Attorney, Agent, or Firm* — Deron A. Cook; Robert E. McDonald; Eryn Ace Fuhrer

(57) ABSTRACT

The present invention provides for a resin system and coating composition suitable for direct application to metal substrates. The composition may include a phosphate functional polyester. The polyester may be an unsaturated polyester polyol. The coating composition may further include a suitable curing agent, such as an isocyanate or melamine. The composition can be applied through traditional application equipment onto a variety of metal substrates and cures to an acceptable surface for further processing, such as top coating with basecoat and clearcoat.

22 Claims, No Drawings

METAL COATING COMPOSITION

This application claims priority from U. S. Provisional Application 61/020,422 filed January 11,2008, now abandoned, the entirety of which is incorporated herein by reference.

DETAILED DESCRIPTION OF THE INVENTION

The present invention relates to coating compositions and resins and resin systems for coating compositions, and more particularly for primer compositions for metal substrates.

Various coating systems exist for application onto metal substrates; however, providing a single coating that has excellent performance, moisture resistance, and adheres well to a wide variety of metals, such as aluminum, steel, stainless steel, and galvaneal, and subsequent coating layers is challenging, but desirable. The approach of the present invention involves the novel use of phosphate functional polyester resins, which may be used in combination with a suitable curing agent and, optionally, other conventional coating additives, to provide a coating composition, such as a primer composition, that demonstrates excellent adhesion to a broad range of metal substrates and is useful in air dry, low bake, and high bake temperature curing environments.

Primer compositions as disclosed herein may be used with either air dry, low bake, or high bake topcoats or sealer coats. Though the compositions of the present invention are described as being useful for primer coats, other embodiments of the compositions may be useful as tinted or clear topcoats or sealer coats. As indicated, the composition provides good adhesion to a broad array of metal substrates, including aluminum, steel, stainless steel, galvaneal, and subsequent paint layers, and offers excellent moisture and corrosion protection.

In accordance herewith there is provided a coating composition. The coating composition, generally, comprises: (a) a phosphate functional polyester polyol resin, and (b) a suitable curing agent. The coating composition may comprise a resin system that includes at least one phosphate functional polyester polyol resin with one or more non-phosphate functional polyester resins. Suitable curing agents may include isocyanates, which may be particularly useful in low temperature cure environments or melamine, which may be particularly useful in higher temperature cure environments.

In accordance with another embodiment, a coating composition may comprise a phosphate functional alkyd or modified alkyd.

One embodiment of the coating composition disclosed herein comprises (i) a resin system comprising at least one phosphate functional polyester polyol and (ii) a curing agent, which may comprise an isocyanate or a blend of isocyanates. Where isocyanates are used as the curing agent, the relative amounts of polyester resin and isocyanate may be expressed by the mole ratio of the reactive isocyanate groups to reactive hydroxyl groups of the polyester polyol resin, which may be from about 0.75:1 to about 2.5:1 NCO:OH molar ratio.

The resin system may comprise a single phosphate functional polyester polyol, a blend of phosphate functional polyesters or a blend of phosphate and non-phosphate functional polyesters.

The coating compositions of the present invention may comprise at least one phosphate functional polyester polyol. Suitable phosphate functional polyester polyols may be obtained by the esterification of at least one phosphonopolycarboxylic acid or anhydride, such as 1-phosphono-1-methylsuccinic acid, phosphonosuccinic acid or 2-phosphonobutane-1,2,4-tricarboxylic acid, or at least one amino phosphate such as aminomethylphosphano acid, with saturated or unsaturated di- or higher polyols, such as ethylene glycol, propylene glycol, diethylene glycol, dipropylene glycol, polyethylene glycol, 1,4-butylene glycol, triethylene glycol, 1,2- and 1,3-propanediols, 1,2-, 1,3- and 1,4-butanediols, 2,2-dimethyl-1,3-propanediol (neopentylglycol), 2-butyl,2-ethyl-1,3-propanediol, 2-hydroxymethyl-2-methyl-1,3-propanediol, 2-buten-1,4-diol, 2-butyn-1,4-diol, 2,4,4-trimethyl-1,3-pentanediol, 1,6-hexane diol, glycerol, pentaerythritol, mannitol, trimethylolethane, trimethylolpropane, 1,4-cyclohexanedimethanol, hydroxypivalylhydroxypivalate, dimethylolpropionic acid, hydrogenated bisphenol A, and others.

In another embodiment, the coating composition may comprise at least one phosphate functional alkyd or modified alkyd. Suitable alkyds may be formed by the esterification of phosphonopolycarboxylic acid or anhydride and fatty acid modified polyols. Fatty acid modified polyols can be derived by alcoholysis (transesterification) of naturally occuring oils, such as tung oil, soybean oil, palm kernel oil, palm oil, oiticica oil, dehydrated castor oil, coconut oil, sunflower oil, tall oil acids, linseed oil, safflower oil, corn oil, cottonseed oil, peanut oil, canola oil, high erucic acid rapeseed oil and hydrogenated high erucic acid rapeseed oil. Useful esterified polyols include monoglyceride and pentaerythritol difatty acid ester Useful fatty acid modified polyols may also be obtained from fatty acid esters of polyols, wherein the hydroxyl groups of the polyol are replaced with esters of fatty acids. Suitable fatty acids used to esterify the polyol may be derived from saturated or unsaturated fatty acids and may include caprylic, capric, lauric, myristic, isomyristic, palmitic, palmitoleic, stearic, ricinoleic, licanic, eleostearic, linolenic, linoleic, oleic, arachidonic, clupanodonic, behenic, isomargaric, anteisoarachadic, maleic, eladic, and erythrogenic acids.

Mixtures of saturated and unsaturated polyols may be used, as may mixtures of phosphonopolycarboxylic acids and aminophosphates.

It will be appreciated that non-phosphate functional di- or higher polycarboxylic acids or anhydrides may be incorporated into the monomer blend used to make the phosphate functional polyester resin in order to effect resin characteristics. For purposes hereof, the term "monomer blend" may include monomers, dimers, trimers, comonomers, oligomers and the like. Unsaturated phosphate functional polyesters are useful and may be obtained by including in the monomer blend an amount of at least one ethylenically unsaturated di- or higher polycarboxylic acid, or anhydride, such as maleic anhydride, tetrahydro phthalic anhydride, phthalic anhydride, fumaric acid, glutaconic acid, itaconic acid, itaconic anhydride mesaconic acid, citraconic acid, allylmalonic acid, tetrahydrophthalic acid, and others. Saturated di- or polycarboxylic acids or anhydrides, such as adipic acid, succinic acid, succinic anhydride, hexahydrophthalic anhydride, sebacic acid, azelaic acid and other, and/or by aromatic di- or higher polycarboxylic acids, such as phthalic acid, trimellitic acid, 2-(sodiosulfo)isophthalic acid, 1,4-cyclohexanedicarboxylic acid, pyromellitic acid, isophthalic acid and terephthalic acid may also be used in the monomer blend. Fatty acid dimers may also be used. Mixtures of saturated and unsaturated di- or higher polyacids and/or mixtures of di- or higher polyols may be used.

The monomer blend giving rise to the phosphate functional polyester resin may comprise from between about 0.02% to about 20% by weight with respect to total monomer weight of phosphate functional monomer(s), such as phosphonopolycarboxylic acid monomers, amino phosphate monomers, or blends thereof. In other embodiments, the phosphate functional monomer portion may be about 0.02% to about 5.0% by weight of the monomer blend. In some embodiments, the monomer blend for the phosphate functional polyester resin may comprise phosphonosuccinic acid in amounts from about 0.5% to about 2% by weight with respect to total monomer weight.

The phosphate functional polyester may have an average hydroxyl functionality of about 1 to about 20 per molecule. In one embodiment, the phosphate functional polyester may have a hydroxyl number from about 50 to about 400 mg KOH/g. However, the phosphate functional polyester may have a hydroxyl number from about 150 to about 300 mg KOH/g. In one useful embodiment, the phosphate functional polyester has a hydroxyl number of about 200 mg KOH/g.

The phosphate functional polyester may have an acid value of between about 1 to about 60 mg KOH/g solid and in other embodiments, about 1 to about 15 mg KOH/g solid.

The phosphate functional polyester may have a number average molecular weight (Mn) of between about 500 and about 5000. In one useful embodiment, the number average molecular weight of the phosphate functional polyester may be from about 1000 to about 3000. In yet another useful embodiment, the number average molecular weight of the phosphate functional polyester may be about 1000.

The glass transition temperature (Tg) of the phosphate functional polyester can generally range between about —30° C. to about 25° C. In one useful embodiment, the Tg is about −20° C.

As previously indicated, unsaturated phosphate functional polyesters polyols are useful. The monomer blend giving rise to the phosphate functional polyester polyol resin may comprise from between about 0.1% to about 40% by weight with respect to total monomer weight of ethylenically unsaturated di- or higher polycarboxylic acids, anhydrides or blends thereof. In other embodiments, the ethylenically unsaturated monomer portion may be about 0.1% to about 20% by weight of the monomer blend. In some embodiments, the monomer blend for the phosphate functional polyester resin may comprise maleic anhydride in amounts of up to about 10% by weight with respect to total monomer weight.

When using an unsaturated phosphate functional polyester in the coating composition, it is desirable to maintain unsaturation of the polyester in the coating, which is believed to enhance adhesion to metal substrates. Conventional uses of unsaturated polyesters in coating compositions promote the curing of the unsaturation of the polyester with monomers such as styrene and vinyl esters. However, in some embodiments of the present invention, the unsaturation on the backbone of the phosphate functional polyester does not involve free-radical reaction of the double bonds. The unsaturated polyester does not undergo further crosslinking in the coating through its double bonds, but rather the polyester undergoes crosslinking through hydroxyl functionality.

It will be appreciated that the coating composition of the present invention may include a combination of unsaturated phosphate functional polyesters and saturated phosphate functional polyesters, or blends of saturated and/or unsaturated phosphate functional polyesters with saturated and/or unsaturated non-phosphate functional polyesters. In some embodiments, a phosphate functional polyester may be prepared from a group of monomers including phosphonosuccinic acid, amino phosphate, trimethylolpropane (TMP), adipic acid, isophthalic acid, neopentyl glycol, and maleic anhydride.

To alter the desired properties of the coating, the resin system may be modified through the addition of other types of thermoplastic and thermoset resin additions. These additions may include but are not limited to acrylics, epoxies, phenoxies, imines, aspartic esters, oxazolidines, low molecular weight polyols, urethane diols, castor oil derivatives, cellulose acetate butyrate resins, vinyl resins, and nitrocellulose resins. The use of the various polyols, isocyanates, and modifying resins are generally known in the art, and their use to achieve desired properties can be accomplished by those skilled in the art.

It is desirable that the resin system comprises at least 25% weight of the phosphate functional polyester resin. In one embodiment the phosphate functional polyester resin may comprise between about 25 to 100% of the resin solids in the resin system. In another embodiment the phosphate functional polyester resin may comprise from about 35 to 100% of the resin solids in the resin system. In yet another embodiment the phosphate functional polyester may comprise from about 50 to 100% of the resin solids in the resin system. In still another embodiment the phosphate functional polyester may comprise from about 75 to 100% of the resin solids in the resin system.

A suitable curing agent that may be utilized in combination with the resin system may be an isocyanate that is selected from isocyanate-functional materials that are well known in the art and include mono-, di-, tri- and multi-functional isocyanates as well as polyisocyanates that utilize di-, tri-, and multi-functional isocyanate material. A curing agent may not be necessary in coating compositions comprising phosphate functional alkyds as previously described.

Suitable isocyanate functional materials include but are not limited to aromatic, cycloaliphatic and aliphatic isocyanates such as cyclohexyl isocyanate, phenyl isocyanate, toluene isocyanate, 1,3 and 1,4 phenylene diisocyanate, 4-chloro-1,3-phenylene diisocyanate, toluene-2,4- or 2,6-diisocyanate, 1,2,4-benzene triisocyanate, 1,5- and 1,4-naphthalene diisocyanate, 2,4' and 4,4' diphenylmethane diisocyanate, 3,3'-dimethyl-4,4'-diphenylene diisocyanate, triphenylmethane triisocyanate, polymethylene polyphenyl isocyanate, 1,6 hexamethylene diisocyanate, isophorone diisocyanate, 4,4-dicyclohexylmethane diisocyanate, 2,2,4(2,4,4)-trimethyl-1,6-hexamethylene diisocyanate, trimethylhexamethylene diisocyanate, 1,4-diisocyanato pentane, isocyanatomethylcyclohexyl isocyanate, 1,6,11-undecane triisocynate, p- and m-tetramethylxylene diisocynate, 1,4-tetramethylene diisocyanate, 1,10-decamethylene diisocyanate, m-xylene diisocyanate, 1,3-bis(isocyanatemethyl)cyclohexane, and mixtures thereof.

It has been found that aliphatic polyisocyanates are particularly useful in accordance with this invention. Blocked isocyanates may be employed as well. However, any known isocyanate may be used. The NCO group of the isocyanate reacts with the hydroxyl groups of the polyester to form crosslinks.

In one embodiment, the curing agent may comprise a blend of isocyanates. For example, the curing agent may comprise a mixture of HDI isocyanate and an IPDI isocyanate resin. In this embodiment, the HDI isocyanate may comprise about 40 to about 100% by weight of the total isocyanate in the coating composition while the IPDI isocyanate resin may comprise about 0 to about 60% by weight of the total isocyanate content in the coating composition. In another useful embodiment, the HDI isocyanate may comprise about 80% by weight of the total isocyanate while the IPDI isocyanate resin comprises about 20% by weight of the total isocyanate.

Generally, a curing agent will be used in an amount sufficient to crosslink with the hydroxyl groups on the polyester(s) and other resins, where present, in the resin system. The relative amounts of the polyester(s) and other resins compared to a curing agent isocyanate may be expressed by the mole ratio of the reactive isocyanate groups to reactive hydroxyl groups. The isocyanate may be present in a ratio of about 0.75:1 to about 1.5:1 based on the NCO:OH ratio. In one useful embodiment, the isocyanate is present in a ratio of about 0.8:1 to about 1.2:1 based on the NCO:OH ratio. In another useful embodiment, the isocyanate is present in a ratio of about 1:1 to about 1.1:1 based on the NCO:OH ratio.

In one embodiment, a catalyst may be used in the coating composition. A catalyst aids in completing or expediting the reaction. Catalysts that may be used in accordance with this invention for the isocyanate-hyroxyl reaction include non-metal catalysts, such as amine catalysts like tertiary amines, including but not limited to triethyl diamine, 1-dimethylamino ethyl-4-methyl piperazine, 1,1,3,5,5-pentamethyl-diethylene triamine, N,N-dimethyl cyclohexylamine, N,N-diethyl piperazine, bis (2-dimethylaminoethyl) ether. Other catalysts that may be used include metal catalysts, including but not limited to dibutyl tin diluarate, dibutyl tin diacetate, dibutyl tin dioctoate, stannous octoate, zinc octoate, potassium octoate, and zirconium octoate. Chelating agents such as 2,4-pentanedione or volatile carboxylic acids may be employed.

In one embodiment, the coating composition may include from about 0% to about 1% catalyst, such as the urethane catalysts described above, by weight based on the total resin solids. In another useful embodiment, the coating composition includes from about 0.005% to about 0.60% catalyst by weight based on the weight of the total resin solids. In yet another useful embodiment, the coating composition includes about 0.03 to 0.19% catalyst by weight based on the total resin solids.

In some embodiments or curing conditions, it may be useful to employ an amino curing agent. Amino curing agents include urea formaldehyde, melamine formaldehyde, benzoguanamine formaldehyde, glycoluril formaldehyde resins and mixtures there of. These amino curing agents may contain varying levels of methylation, alkylation, degree of polymerization, and functionality. The alkoxy groups may include but not limited to methoxy, ethoxy, n-butoxy, or iso-butoxy groups or combinations thereof. The amino curing agents may also include carboxylic acid and other forms of modification. The amino curing agents react with hydroxyl groups and homopolymerize to form crosslinks. The amino curing agent may be used in amounts of from about 5 to about 50% by weight based on the total resin solids.

Suitable catalysts for use with amino curing agents include but are not limited to blocked and unblocked p-toluene sulfonic acid, dodecylbenzene sulfonic acid, dinonylnaphthalene sulfonic acid, dinonylnaphthalene disulfonic acid, alkyl acid phosphate, phenyl acid phosphate, phosphoric acid, carboxylic acids, and metal salts such as magnesium bromide, aluminum nitrate, and zinc nitrate. Catalyst level can range from 0.2-7% by weight based on the total resin solids.

The coating composition may, also, contain fillers or extenders that may be organic or inorganic, as well as mixtures thereof. Suitable fillers or extenders which may be added to the composition for various properties include the commonly used fillers or extenders, such as carbonates, silicates, sulfates, silicas, sulfites, clays, carbides, oxides, polyfluorinated ethylenes, ferrites, aluminas, nitrides, polymeric fillers, fibers, cellulosics, ceramics, and the associated precipitates, derivatives, and hydrates and the like, as well as mixtures thereof. These extenders may be in a treated or non-treated form, and may be natural occurring products or synthetically manufactured, and may be reclaimed or recycled, as well as combinations thereof.

The coating composition may include inorganic and organic corrosion inhibitors to minimize the potential for corrosion of metallic substrates. One or more corrosion inhibitors may used to achieve adequate corrosion protection. Many inorganic corrosion inhibiting pigments are available in different variations of borates, chromates, leads, molybdates, nitrates, phosphates, phosphites, and silicates. Some of these variations include barium metaborate, zinc borate, zinc potassium chromate, zinc tetroxy chromate, strontium chromate, red lead, basic lead silicochromate, zinc molybdate, calcium molybdate, calcium zinc molybdate, zinc phosphate, strontium phosphate, calcium phosphate, aluminum triphosphate, aluminum zinc phosphate, zinc calcium phosphate, zinc aluminum calcium phosphate, zinc calcium strontium phosphate, zinc calcium aluminum strontium phosphate, strontium aluminum phosphate, calcium aluminum phosphate, zinc borate phosphate hydrate, zinc hydroxy phosphate, calcium borosilicate, calcium barium phosphosilicate, calcium strontium phosphosilicate, calcium strontium zinc phosphosilicate, calcium ion exchange silica, zinc oxide, and zinc dust. Organic corrosion inhibitors include but are not limited to 2-benzothiazolylthio-succinic acid, amine salt of 2-benzothiazolylthio-succinic acid, and amine, barium, calcium, magnesium, and zinc salts of dinonylnaphthalene mono sulfonic acid.

The coating composition may contain one or more pigments to introduce color to the composition. Common pigments used may include, titanium dioxide, phthalos, iron oxides, lamp black, carbon black, various organic and inorganic pigments, and mixtures thereof.

In one embodiment of the present invention, the primer composition may contain pigments such that the composition is about 100% to 250% by weight pigments based on the weight of the total resins solids. In one useful embodiment the pigments may comprise about 180% by weight based on the weight of the total resin solids.

Minor amounts of dispersing aids (such as, for example, polymeric dispersants) may be used to disperse and stabilize pigments. Any type of conventional dispersant may be used in accordance with this invention, such as anionic, cationic, amphoteric, or nonionic dispersants. Such dispersing agents include polymeric dispersants. In addition, particle dispersants may also be used.

Particle dispersants are particles that are very similar to the pigment to be dispersed promoting absorption on to that pigment particle. These particle dispersants, such as the Solsperse technology sold by Lubrizol Corp., are modified and contain anchoring sites to accept pigment dispersants. Useful dispersants may also include those described in U.S. Pat.No. 7,638,577.

In one embodiment, the coating composition may include from about 0.1% to about 30%, by weight, dispersant based on the total pigment weight in the composition. In another useful embodiment the dispersant may be present in an amount from about 0.5% to about 20%, by weight, based upon the total pigment weight of the composition. In yet another useful embodiment, dispersant is present in an amount of about 1% by weight, based on the total pigment of the composition.

Flow additives, defoamers, deaerators, suspension aids, scavengers, stabilizers, antioxidants, plasticizers, nonfunctional or nonreactive diluents, hydrocarbon oils, conductive additives, and the like, as well as mixtures thereof may be incorporated into the composition to tailor the properties of the primer/sealer. These and other additives generally comprise from about 0 to 2.5% by weight based on the total resin solids.

Additional adhesion promotion may be obtained through the use of adhesion promoting additives or coupling agents. These additives include but are not limited to organosilanes, titanates, zirconates, aluminates, and alkyl phosphate esters. These additives generally comprise from about 0 to 4% of the total paint weight.

In one embodiment, a solvent, or mixture of solvents, may be used in accordance with this invention. Although most conventional solvents that are used in the coatings industry may be used in accordance with this invention, in one embodiment, examples of useful solvents include oxygenated and hydrocarbon solvents. Oxygenated solvents typically consist of ketones and esters, and include but are not limited to acetone, methyl ethyl ketone, methyl propyl ketone, methyl isobutyl ketone, methyl n-amyl ketone, C-11 ketone, cyclohexanone, diisobutyl ketone, and methyl isoamyl ketone, as well as methyl acetate, ethyl acetate, n-propyl acetate, isopropyl acetate, n-butyl acetate, isobutyl acetate, 2-ethylhexyl acetate, n-butyl propionate, n-pentyl propionate, ethyl 3-ethoxypropoinate, propylene glycol methyl ether acetate, dipropylene glycol methyl ether acetate, ethylene glycol butyl ether acetate, and diethylene glycol butyl ether acetate. Hydrocarbon solvents that may be used in accordance with this invention include but are not limited to aromatic and halogenated solvents, such as for example toluene, xylene, aromatic 100, aromatic 150, aromatic 200, and parachlorobenzotrifluoride.

The useful typical method for applying the coatings of the present invention is by spraying. Various types of spray applications may be used. For example, the coating composition may be spray applied using air atomizing spray, airless spray, and air assisted airless application Air spray equipment includes conventional air spray (using 20-80 psi air pressure to atomize the liquid coating) which provides a low level of transfer efficiency, and high volume low pressure (HVLP) (uses less than 10 psi air pressure and 12-16 cubic feet of air per minute to atomize the liquid coating) which provides a higher level of transfer efficiency than conventional methods of application. Airless spray application (using 1500-3000 psi fluid pressure to force the coating through a small orifice to atomize the liquid coating) provides atomization for high viscosity coatings, and improved transfer efficiencies. Air assisted airless (using 700-1200 psi fluid pressure to force the coating though a small orifice and up to 35 psi atomization air to atomize the liquid coating) provides atomization for higher viscosity coating, and improved film smoothness and appearance over airless application.

Additional application methods consist of electrostatic application using air atomizing spray equipment, air assisted airless, and high-speed rotary application equipment such as a bell or disc. Electrostatic application provides a higher level of transfer efficiency as compared to other non-electrostatic application.

As noted hereinabove the present coating composition may be useful both as primer and sealer. After being deposited onto a surface, other coatings may be applied via known methods. Other coatings may be applied to the primer or sealer before the curing process has begun (wet on wet application), after cure has begun, or after cure is complete.

The primer as disclosed herein contains good adhesion characteristics to metal substrates including but not limited to aluminum, anodized aluminum, cold rolled steel, hot rolled steel, stainless steel, hot dipped galvaneal, electrogalvaneal, hot dipped galvanized, electrogalvanized, and iron, manganese, or zinc phosphated steel.

Preparation of an uncoated metallic substrate may include cleaning the surface. Cleaning may involve mechanical cleaning, chemical cleaning, or both. Mechanical cleaning involves abrading the surface of the substrate by brushing, grinding, blasting, or wet and dry tumbling. Mechanical cleaning may be done by powered equipment or by hand.

Chemical cleaning may involve the use of one or more types of cleaning agents such as solvent cleaners, water-based cleaners, water based emulsion cleaners, alkaline cleaners (mild to strong), and acidic cleaners (mild to strong). Methods of cleaning with chemical cleaning agents include hand wiping and scrubbing, immersion cleaning, spray cleaning, steam cleaning, vapor degreasing, ultrasonic cleaning, and anodic and cathodic electrocleaning. Solvent cleaners may include various solvents including, but not limited to, aliphatic hydrocarbon solvents, naphtha, mineral spirits, toluene, xylene, dipentene, methanol, propanol, butoxyethanol, acetone, methyl isobutyl ketone, dimethoxypropane and mixtures thereof. Water based cleaners may comprise various detergent ingredients and water. The detergent and cleaning ingredients may include surfactants (anionic, cationic, and non-ionic), 2-methoxymethylethoxypropanol, 2-butoxyethanol, 2-(2-Butoxyethoxy)-ethanol, tripropylene glycol ether, phosphoric acid, potassium fluoride, and nickel dihydrogen phosphate.

The coating may be cured under air dry conditions, but a low temperature bake may be used as well. A low temperature bake may comprise of exposing the surface to temperatures of 70° F. to 180° F. for about 15-30 minutes. Higher bake temperatures such as 180° F. to 300° F. may be used as well. Moreover, the cure time, may range from about 10 minutes to about 60 minutes, as dependent on the oven temperature. Conventional ovens can be employed to cure the composition once it is applied onto a surface. The primer alternatively has the capacity to be cured with IR radiation or other devices. Upon curing, the material polymerizes on the substrate, providing adhesion thereto.

In one useful embodiment, the polymer of the present invention may be cured by air dry conditions. In another useful embodiment, the polymer of the present invention may be cured by thermal exposure, such as by exposure in a conventional oven or through an IR cure, or combinations thereof.

For a more complete understanding of the present invention reference is made to the following illustrative examples.

Preparation of Phosphate Functional Polyester

RESIN EXAMPLE 1

A 5-liter reactor was equipped with stirrer, thermocouple, nitrogen inlet, packed column, condenser and receiver. The reactor was charged with 433.6 g of trimethylolpropane, 1009.7 g of neopentyl glygol, 471.8 g of adipic acid, 643.7 g of isophthalic acid, 285.2 g of maleic anhydride and 1.8 g of butyl stanoic acid. The reaction mixture was gradually heated to 210° C. under agitation and nitrogen blanket, while maintaining maximum packed column head temperature of 100° C. The temperature was held at 210° C. until the acid value reached 5 mg KOH/g maximum. The mixture was then cooled to 130° C. before 729.1 g of n-butyl acetate was added. The reaction solution was mixed well, cooled, filtered and discharged. The product had a solid content of 75.3% by weight, Gardner color of 0.1, density of 9.11 lb/gal, acid value of 3.9 mg KOH/g, Gardner viscosity of X~Y.

RESIN EXAMPLE 2

To a reactor as described in Resin Example 1, 148.3 g of trimethylolpropane, 717.5 g of neopentyl glycol, 270.4 g of adipic acid, 654.8 g of isophthalic acid, 9.0 g of phosphonosuccinic acid and 1.2 g of butyl stanoic acid were charged. The reaction mixture was gradually heated to 190° C. under agitation and nitrogen blanket, while maintaining maximum head temperature of 100° C. The temperature was held at 190° C. until the acid value reached 10 mg KOH/g maximum. The mixture was then cooled to 130° C. before 504.0 g of n-butyl acetate was added. The reaction solution was mixed well, cooled, filtered and discharged. The product had a solid content of 73.8% by weight, Gardner color of 0.0, density of 9.04 lb/gal, acid value of 7.6 mg KOH/g, Gardner viscosity of V.

RESIN EXAMPLE 3

To a reactor as previously described, 87.7 g of trimethylolpropane, 762.3 g of neopentyl glycol, 318.0 g of adipic acid, 433.9 g of isophthalic acid, 180.1 g of maleic anhydride, 18.0 g of phosphonosuccinic acid and 1.2 g of butyl stanoic acid were charged. The reaction mixture was gradually heated to 190° C. under agitation and nitrogen blanket, while maintaining maximum head temperature of 100° C. The temperature was held at 190° C. until the acid value reached 10 mg KOH/g maximum. The mixture was then cooled to 130° C. before 414.0.0 g of n-butyl acetate was added. The reaction solution was mixed well, cooled, filtered and discharged. The product had a solid content of 76.0% by weight, Gardner color of 0.0, density of 9.01 lb/gal, acid value of 10.6 mg KOH/g, Gardner viscosity of X.

RESIN EXAMPLE 4

To a reactor as previously described, 932.2 g of neopentyl glycol, 283.2 g of adipic acid, 386.4 g of isophthalic acid, 180.1 g of maleic anhydride, 18.1 g of phosphonosuccinic acid and 1.2 g of butyl stanoic acid were charged. The reaction mixture was gradually heated to 190° C. under agitation and nitrogen blanket, while maintaining maximum head temperature of 100° C. The temperature was hold at 190° C. until the acid value reached 10 mg KOH/g maximum. The mixture was then cooled to 130° C. before 414.0 g of n-butyl acetate was added. The reaction solution was mixed well, cooled, filtered and discharged. The product had a solid content of 73.2% by weight, Gardner color of 0.0, density of 8.87 lb/gal, acid value of 8.4 mg KOH/g, Gardner viscosity of K.

RESIN EXAMPLE 5

To a reactor as previously described, 1595.0 g of neopentyl glycol, 425.9 g of adipic acid, 581.1 g of isophthalic acid, 207.9 g of maleic anhydride, 27.1 g of phosphonosuccinic acid and 1.9 g of butyl stanoic acid were charged. The reaction mixture was gradually heated to 190° C. under agitation and nitrogen blanket, while maintaining maximum head temperature of 100° C. The temperature was hold at 190° C. until the acid value reached 12 mg KOH/g maximum. The mixture was then cooled to 130° C. before 339.3 g of n-butyl acetate was added. The reaction solution was mixed well, cooled, filtered and discharged. The product had a solid content of 80.2% by weight, Gardner color of 0.0, density of 9.06 lb/gal, acid value of 11.8 mg KOH/g, Gardner viscosity of Z–.

RESIN EXAMPLE 6

To a reactor as previously described, 1090.0 g of neopentyl glycol, 397.2 g of isophthalic acid, 185.2 g of maleic anhydride, 19.9 g of aminomethylphosphono acid, 307.4 g of hexahydrophthalic anhydride and 1.9 g of butyl stanoic acid were charged. The reaction mixture was gradually heated to 190° C. under agitation and nitrogen blanket, while maintaining maximum head temperature of 100° C. The temperature was hold at 190° C. until the acid value reached 10 mg KOH/g maximum. The mixture was then cooled to 130° C. before 277.0 g of n-butyl acetate was added. The reaction solution was mixed well, filtered and discharged. The product had a solid content of 80.2% by weight, Gardner color of 2.8, density of 9.10 lb/gal, acid value of 9.4 mg KOH/g, Gardner viscosity of Z3+.

Preparation of Primer

PRIMER EXAMPLE 1

131.7 grams of the polyester described in Resin Example 1, 16.7 grams of Shersperse S (a proprietary dispersant of The Sherwin-Williams Company), 17.6 grams of ethyl 3-ethyloxypropionate, and 4.5 grams of methyl n-amyl ketone were placed in a container. The contents were mixed with a cowles blade for 5 minutes. 214.6 grams of barium sulfate, 175.2 grams of titanium dioxide (Ti-Pure R706 from DuPont), 66.9 grams of ceramic microspheres (Zeeospheres W210 from 3M Chemicals), 59.1 grams of calcium carbonate, 2.1 grams of rheological additive (Bentone SD-2 from Elementis), and 18.1 grams of methyl n-amyl ketone were slowly added under medium agitation. The batch was mixed at high speed for 30 minutes to achieve a grind/clean of 6H/5H. Then 87.8 grams of polyester described in Resin Example 1, 5.5 grams of a 2% dibutyl tin diluarte/n-butyl acetate solution (Air Products and Chemicals), and 10 grams of methyl n-propyl ketone was added to the batch and mixed for 5 minutes.

The primer was catalyzed with 90.2 grams of HDI trimer (Tolonate HDT-LV from Rhodia Inc.) and 35.1 grams of IPDI (Desmodur Z4470 SN/BA from Bayer Corporation), and reduced with 162.6 grams of n-butyl acetate, 16.3 grams of 1-methyloxy-2-propanol acetate, and 3.1 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 8B over 5052 aluminum, 6B over 6111 aluminum, 8B over 3003 aluminum, 5B over cold rolled steel, 5B over hot dipped galvaneal, and 5B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 0B over electrogalvaneal. In 96 hour humidity, 9D blisters were seen over electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 0B over electrogalvaneal. In 240 hour water immersion, 7D blisters were seen over electrogalvaneal.

PRIMER EXAMPLE 2

133.7 grams of polyester described in Resin Example 2, 16.6 grams of Shersperse S, 16.0 grams of ethyl 3-ethyloxypropionate, and 4.1 grams of methyl n-amyl ketone were placed in a container. The contents were mixed with a cowles blade for 5 minutes. 213.3 grams of barium sulfate, 174.1 grams of titanium dioxide, 66.5 grams of ceramic microspheres, 58.7 grams of calcium carbonate, 2.1 grams of rheological additive, and 16.5 grams of methyl n-amyl ketone were slowly added under medium agitation. The batch was mixed at high speed for 30 minutes to achieve a grind/clean of 6H/5H. Then 89.2 grams of polyester described in Resin Example 2, 5.5 grams of a 2% dibutyl tin diluarte/n-butyl acetate solution, and 9.1 grams of methyl n-propyl ketone was added to the batch and mixed for 5 minutes.

The primer was catalyzed with 88.8 grams of HDI and 34.5 grams of IPDI, and reduced with 161.5 grams of n-butyl acetate, 16.2 grams of 1-methyloxy-2-propanol acetate, and 3.1 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 6B over 5052 aluminum, 7A over 6111 aluminum, 7B over 3003 aluminum, 6B over cold rolled steel, 6B over hot dipped galvaneal, and 5B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 2B over electrogalvaneal. In 96 hour humidity, 9D blisters were seen over 5052 aluminum, 6111 aluminum, 3003 aluminum, cold rolled steel, hot dipped galvaneal, and electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 0B over electrogalvaneal. In 240 hour water immersion, 9D blisters were seen over 5052 aluminum, 6111 aluminum, 3003 aluminum, cold rolled steel, and hot dipped galvaneal, and 8D blisters were seen over electrogalvaneal.

PRIMER EXAMPLE 3

140.31 grams of polyester described in Resin Example 3, 15.3 grams of Shersperse S, 17.2 grams of ethyl 3-ethyloxypropionate, and 4.4 grams of methyl n-amyl ketone were placed in a container. The contents were mixed with a cowles blade for 5 minutes. 195.6 grams of barium sulfate, 159.7 grams of titanium dioxide, 60.7 grams of ceramic microspheres, 53.9 grams of calcium carbonate, 2.1 grams of rheological additive, and 17.7 grams of methyl n-amyl ketone were slowly added under medium agitation. The batch was mixed at high speed for 30 minutes to achieve a grind/clean of 6H/5H. Then 93.5 grams of polyester described in Resin Example 3, 5.5 grams of a 2% dibutyl tin diluarte/n-butyl acetate solution, and 9.8 grams of methyl n-propyl ketone was added to the batch and mixed for 5 minutes.

The primer was catalyzed with 60.1 grams of HDI and 23.4 grams of IPDI, and reduced with 138.8 grams of n-butyl acetate, 14.7 grams of 1-methyloxy-2-propanol acetate, and 2.8 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 7B over 5052 aluminum, 6B over 6111 aluminum, 7B over 3003 aluminum, 6B over cold rolled steel, 5B over hot dipped galvaneal, and 5B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 4B over electrogalvaneal. In 96 hour humidity, 9D blisters were seen over electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 5B over electrogalvaneal. In 240 hour water immersion, 9D blisters were seen over 5052 aluminum and 8D blisters were seen over electrogalvaneal.

PRIMER EXAMPLE 4

133.7 grams of polyester described in Resin Example 4, 16.5 grams of Shersperse S, 15.7 grams of ethyl 3-ethyloxypropionate, and 4.0 grams of methyl n-amyl ketone were placed in a container. The contents were mixed with a cowles blade for 5 minutes. 211.2 grams of barium sulfate, 172.5 grams of titanium dioxide, 65.9 grams of ceramic microspheres, 58.2 grams of calcium carbonate, 2.1 grams of rheological additive, and 16.22 grams of methyl n-amyl ketone were slowly added under medium agitation. The batch was mixed at high speed for 30 minutes to achieve a grind/clean of 6H/5H. Then 89.1 grams of polyester described in Resin Example 4, 5.5 grams of a 2% dibutyl tin diluarte/n-butyl acetate solution, and 9.0 grams of methyl n-propyl ketone was added to the batch and mixed for 5 minutes.

The primer was catalyzed with 84.9 grams of Tolonate HDI and 33.0 grams of IPDI, and reduced with 158.4 grams of n-butyl acetate, 16.0 grams of 1-methyloxy-2-propanol acetate, and 3.1 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 6B over 5052 aluminum, 6A over 6111 aluminum, 8A over 3003 aluminum, 5B over cold rolled steel, 5B over hot dipped galvaneal, and 5B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 5B over electrogalvaneal. In 240 hour water immersion, 9D blisters were seen over 5052 aluminum and electrogalvaneal.

PRIMER EXAMPLE 5

110.9 grams of polyester described in Resin Example 5, 18.1 grams of Shersperse S, 18.9 grams of ethyl 3-ethyloxypropionate, and 4.8 grams of methyl n-amyl ketone were placed in a container. The contents were mixed with a cowles blade for 5 minutes. 231.5 grams of barium sulfate, 189.0 grams of titanium dioxide, 72.2 grams of ceramic microspheres, 63.8 grams of calcium carbonate, 2.2 grams of rheological additive, and 19.5 grams of methyl n-amyl ketone were slowly added under medium agitation. The batch was mixed at high speed for 30 minutes to achieve a grind/clean of 6H/5H. Then 73.9 grams of polyester described in Resin Example 5, 5.9 grams of a 2% dibutyl tin diluarte/n-butyl acetate solution, and 10.58 grams of methyl n-propyl ketone was added to the batch and mixed for 5 minutes.

The primer was catalyzed with 115.9 grams of HDI and 45.0 grams of IPDI, and reduced with 193.6 grams of n-butyl acetate, 19.0 grams of 1-methyloxy-2-propanol acetate, and 3.7 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 8B over 5052 aluminum, 8B over 6111 aluminum, 10A over 3003 aluminum, 6B over cold rolled steel, 6B over hot dipped galvaneal, and 6B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 5B over electrogalvaneal. In 240 hour water immersion, 9D blisters were seen over 5052 aluminum.

PRIMER EXAMPLE 6

112.3 grams of polyester described in Resin Example 6, 17.9 grams of Shersperse S, 18.8 grams of ethyl 3-ethyloxypropionate, and 4.8 grams of methyl n-amyl ketone were placed in a container. The contents were mixed with a cowles blade for 5 minutes. 229.7 grams of barium sulfate, 187.5 grams of titanium dixoide), 71.7 grams of ceramic microspheres, 63.3 grams of calcium carbonate, 2.2 grams of rheological additive, and 19.3 grams of methyl n-amyl ketone were slowly added under medium agitation. The batch was mixed at high speed for 30 minutes to achieve a grind/clean of 6H/5H. Then 75.2 grams of polyester described in Resin Example 6, 5.8 grams of a 2% dibutyl tin diluarte/n-butyl acetate solution, and 10.7 grams of methyl n-propyl ketone was added to the batch and mixed for 5 minutes.

The primer was catalyzed with 113.3 grams of HDI and 44.1 grams of IPDI, and reduced with 191.5 grams of n-butyl acetate, 18.8 grams of 1-methyloxy-2-propanol acetate, and 3.6 grams of 2-butoxyethyl acetate.

The primer and topcoat were applied to 5052 aluminum, 6111 aluminum, 3003 aluminum, cold rolled steel, hot dipped galvaneal, and electrogalvaneal substrates as described in the application procedures. This example provided a gravelometer rating of 10A over 5052 aluminum, 7A over 6111 aluminum, 9A over 3003 aluminum, 6B over cold rolled steel, 8A over hot dipped galvaneal, and 7B over electrogalvaneal. Dry adhesion was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 96 hour humidity was 5B over 5052 aluminum, 5B over 6111 aluminum, 5B over 3003 aluminum, 5B over cold rolled steel, 5B over hot dipped galvaneal, and 5B over electrogalvaneal. Wet adhesion in 240 hour water immersion was 5B over 5052 aluminum, 5B over 6111 aluminum, 5B over 3003 aluminum, 5B over cold rolled steel, 5B over hot dipped galvaneal, and 5B over electrogalvaneal. In 240 hour water immersion, 9D blisters were seen over cold rolled steel.

Substrate Preparation

Aluminum (5052, 6111, 3003) and Cold rolled steel panels were abraded with 180 grit sand paper with a dual action sander. Hot dipped galvaneal, electrogalvaneal, and abraded aluminum and cold rolled steel substrates were cleaned with R7K158 SHER-WILL-CLEAN™ solvent cleaner and dried.

Primer Application Procedure

Primer components were mixed and reduced as described in each individual example. The primer was applied to already cleaned substrates. Primer was applied within 6 hours of substrate preparation. The primer was applied with conventional air spray application equipment to a dry film thickness of 1.5-2.5 mils. The primer received a 24 hour flash before topcoat application.

Topcoat Application Procedure

The topcoat system used was an acrylic polyurethane single stage topcoat (Genesis® from The Sherwin-Williams Company). The topcoat was applied with conventional air spray application equipment. The topcoat was applied to a dry film thickness of 2.0-2.5 mils. The topcoat was allowed to cure under ambient conditions.

Paint Evaluation Procedure

Testing of the painted substrate began no sooner than 7 days after the primed substrate had been topcoated. Testing consisted of specific test methods and test equipment described in ASTM and SAE Test Methods.

ASTM References

ASTM D3359 Adhesion Method B

ASTM D2247 Humidity

ASTM D714 Degree of Blistering

ASTM D870 Water Immersion

SAE J400 gravelometer Method A

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A coating composition, comprising:
   (a) a phosphate functional polyester polyol, which is the esterification reaction product of a monomer blend comprising: (1) at least one phosphorus containing monomer selected from the group consisting of phosphonopolycarboxylic acids and phosphonopolycarboxylic anhydrides and (2) at least one other non-phosphorus containing monomer selected from di- or higher polyols, diacids, and anhydrides; and
   (b) a curing agent suitable for crosslinking with at least one of the hydroxyl groups of the phosphate functional polyester polyol.

2. The composition of claim 1, wherein the phosphate functional polyester polyol is unsaturated in the backbone of the polyester and does not undergo crosslinking in the coating composition through double bonds in the backbone of the polyester.

3. The composition of claim 1, wherein the phosphorus containing monomer is phosphonosuccinic acid.

4. The composition of claim 3, wherein the monomer blend comprises from about 0.02 to about 20 weight percent of phosphonosuccinic acid with respect to the total monomer weight in the monomer blend.

5. The composition of claim 1, wherein the phosphate functional polyester polyol is prepared from the reaction product of a monomer blend comprising:
  (a) a phosphonopolycarboxylic acid,
  (b) at least one di or higher polyol,
  (c) at least one other non-phosphorus containing diacid, and
  (d) at least one anhydride.

6. The composition of claim 5, wherein the monomer blend comprises up to about 10 weight percent of the at least one anhydride.

7. The composition of claim 6, wherein the anhydride is maleic anhydride.

8. The composition of claim 1, wherein the polyester has a number average molecular weight from about 500 to about 3000.

9. The composition of claim 1, wherein the polyester has an OH value from about 40 to about 400 mg KOH/g.

10. The composition of claim 1, wherein the curing agent comprises an isocyanate.

11. The composition of claim 10, wherein the isocyanate comprises a blend of HDI isocyanate and IPDI isocyanate.

12. The composition of claim 11, wherein the curing agent is present in a ratio of about 0.8 to about 1.2 based on the NCO:OH ratio of the polyester and curing agent.

13. The composition of claim 1, wherein the curing agent is an amino curing agent.

14. The composition of claim 1, further comprising a pigment.

15. The composition of claim 14, wherein the pigment comprises barium sulfate, titanium dioxide, and blends thereof.

16. The composition of claim 14, further comprising ceramic microspheres.

17. A polyester prepared as the esterification reaction product of a monomer blend comprising a polyol, phosphonosuccinic acid and at least one other non-phosphate functional ethylenically unsaturated polycarboxylic acid.

18. The polyester of claim 17, wherein the monomer blend comprises between about 0.5% and about 10% weight percent phosphonosuccinic acid.

19. The polyester of claim 18, wherein the monomer blend comprises between about 5 and about 25 weight percent maleic anhydride.

20. The polyester of claim 19 having a number average molecular weight of between about 500 and 3000.

21. A coating composition, comprising:
  a phosphate functional alkyd formed from the esterification reaction product of a monomer blend comprising:
    (a) a fatty acid modified polyol; and
    (b) a phosphate functional monomer selected from the group consisting of phosphonopolycarboxylic acids and phosphonopolycarboxylic anhydrides.

22. The coating composition of claim 21 further comprising a curing agent selected from the group consisting of an isocyanate curing agent and an amino curing agent.

* * * * *